UNITED STATES PATENT OFFICE.

SILAS M. BROOKS, OF BURLINGTON, ASSIGNOR OF TWO-THIRDS TO CHARLES A. HART AND PHELPS F. SMITH, OF CANTON, CONNECTICUT.

COMPOUND FOR PROTECTING TREES, &c.

SPECIFICATION forming part of Letters Patent No. 495,957, dated April 25, 1893.

Application filed January 17, 1893. Serial No. 458,719. (No specimens.)

*To all whom it may concern:*

Be it known that I, SILAS M. BROOKS, a citizen of the United States of America, residing at Burlington, in the county of Hartford and State of Connecticut, have invented a certain new and useful Compound for the Treatment of Trees and Plants, of which the following is a specification.

The compound consists of liquid styrax, vegetable oil, and bird lime, in preferred proportions substantially as follows:—two pounds styrax, ten pounds vegetable oil, one pound of bird lime. These ingredients are mixed and thoroughly incorporated by agitation.

The compound is useful for application, as by a brush, to trees, shrubs, and plants, to ward off and destroy animal life, to heal all manner of cuts, wounds, and bruises, and for curing many diseases to which these classes of vegetables are liable.

I claim as my invention—

The compound of liquid styrax, vegetable oil, and bird lime, substantially as described.

In witness whereof I have hereto set my hand in the presence of two attesting witnesses.

SILAS M. BROOKS.

Attest:
STEPHEN J. LYON,
JOHN D. ANDREWS.